United States Patent
Jeong

(10) Patent No.: US 7,658,525 B2
(45) Date of Patent: Feb. 9, 2010

(54) BACKLIGHT ASSEMBLY AND LCD HAVING THE SAME

(75) Inventor: In Suk Jeong, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/165,053

(22) Filed: Jun. 24, 2005

(65) Prior Publication Data

US 2006/0002133 A1    Jan. 5, 2006

(30) Foreign Application Priority Data

Jun. 30, 2004    (KR) .................... 10-2004-0049949

(51) Int. Cl.
*F21V 7/04* (2006.01)

(52) U.S. Cl. .............. 362/551; 362/260; 362/609; 362/225; 362/614; 349/58; 349/64

(58) Field of Classification Search ................ 362/551, 362/260, 235, 23, 249, 97, 609, 634; 349/70
See application file for complete search history.

(56) References Cited

U.S. PATENT DOCUMENTS

| 6,939,020 B2 * | 9/2005 | Lim ........................... 362/97 |
| 2004/0001345 A1 * | 1/2004 | Lee et al. .................... 362/561 |
| 2005/0013134 A1 * | 1/2005 | Yoo et al. .................... 362/235 |
| 2005/0253981 A1 * | 11/2005 | Kruijt et al. .................. 349/70 |

FOREIGN PATENT DOCUMENTS

| JP | 2003-168395 A | 6/2003 |
| JP | 2003-178718 A | 6/2003 |
| KR | 10-2003-0042189 | 5/2003 |

* cited by examiner

*Primary Examiner*—Sandra L O'Shea
*Assistant Examiner*—Jessica L McMillan
(74) *Attorney, Agent, or Firm*—McKenna, Long & Aldridge

(57) ABSTRACT

A backlight assembly includes: an EEFL (external electrode fluorescent lamp) including an external electrode through which a driving voltage is applied, and a lamp for emitting light; a side support for supporting the EEFL; and a protective cap disposed above a portion of the external electrode, the portion of the external electrode being exposed out of the side support.

11 Claims, 6 Drawing Sheets

BACKLIGHT ASSEMBLY AND LCD HAVING THE SAME

This application claims the benefit of Korean Patent Application No. 2004-49949, filed on Jun. 30, 2004, which is hereby incorporated by reference for all purposes as if fully set forth herein.

BACKGROUND OF THE INVENTION

1. Field of the Invention

The present invention relates to a backlight assembly and an LCD having the same.

2. Description of the Related Art

A current trend in the development of display devices is to replace the cathode ray tube (CRT) with a liquid crystal display (LCD) or a plasma display panel (PDP). The LCD has been found to have lower power consumption, slimmer profile, and lighter weight compared with the CRT. In addition, LCD devices do not generate harmful electromagnetic waves. For these reasons, LCD devices are considered the next generation in display device technology.

Generally, an LCD includes a lower substrate on which thin film transistors (TFTs) are formed, an upper substrate on which color filters are formed, and a liquid crystal layer formed between the lower substrate and the upper substrate. The TFTs transmit and control electric signals to generate voltages. These generated voltage in turn change the molecular structure of the liquid crystals injected in the liquid crystal layer thereby controlling the transmittance of light to display desired colors and images.

Since the LCD displays an image by controlling light incident from outside, it requires an additional light source, for example, a backlight assembly, to irradiate light onto the liquid crystal panel. Backlight assemblies are generally classified into an edge type or a direct type according to the position of the light source with respect to a display panel. Of the two types, the direct type backlight assembly is more widely used in a large-sized LCD devices because of its high optical utilization and lack of size limitations.

An external light source for a direct type backlight assembly is selected based on the size and purpose of use of the LCD. The external light source may include a point light source such as a light bulb or a white halogen lamp, a line light source such as a fluorescent lamp, and a surface light source such as a light emitting diode (LED) of an electro luminescent (EL) or matrix type.

Cold cathode fluorescent lamps (CCFL) that have generally been used as the light source are gradually being replaced with external electrode fluorescent lamps (EEFL) due to the fact that a plurality of EEFLs may be controlled by one inverter. The resulting decrease in parts causes a great reduction in manufacturing costs and weight of the LCD.

FIG. 1 is an exploded perspective view of a direct type backlight assembly according to the related art and FIG. 2 is an enlarged perspective view illustrating the connection between an EEFL and a side support of the backlight assembly of FIG. 1.

Referring to FIGS. 1 and 2, the direct type backlight assembly 1 includes a plurality of lamps 13 having external electrodes 15 formed on each end, side supports 17 for supporting the plurality of lamps 13, a diffusion plate 19, and a bottom plate 11 positioned above and below the plurality of lamps 13, respectively.

A driving voltage (not shown) is applied to the external electrodes 15 and the lamp 13 emits light. Accordingly, these lamps are referred to as EEFLs.

The external electrodes 15 are inserted inside the side supports 17. To prevent the external electrodes from being exposed outside of the side supports 17, the length of the external electrodes 15 must be less than or equal to the width of the side support. However, reducing the length of the external electrodes results in increased driving voltage for the lamp 13 Large-sized LCD panels require longer EFFLs resulting in even higher driving voltages. Consequently, it is difficult to apply the EEFL to the LCD.

One approach to reduce the driving voltage of the EEFL is to increase the length of the external electrodes thereby expanding the surface area of the external electrode and decreasing the required driving voltage. However, this approach requires that the width of the side supports or bezel be widened to cover the increased length of the external electrodes with increases the non-viewable area of the LCD device.

In order to prevent the bezel width from being widened and expand the length of the external electrodes, approaches have been developed which expose the external electrode out of the side support toward an inner space of the backlight assembly, as shown in FIG. 3B. However, backlight assemblies made in accordance with these approaches, degrade picture quality due to darkness because the exposed external electrode does not emit light well as discussed below with reference to FIGS. 3A and 3B.

As shown in FIG. 3A, when the entire surface of the external electrodes is inserted into the side support 17, only the lamp 13 is exposed out of the side support 17. Accordingly, images are displayed with uniform picture quality on a liquid crystal panel 31. However, as shown in FIG. 3B, when the external electrode 15 and the lamp 13 are exposed out of the side support 17, images are not displayed with uniform quality. More specifically, the picture quality is degraded in the area corresponding to the exposed external electrode. This degradation in picture quality is referred to as a mura 33. Since the external electrode 15 is not a light emission region, a dark region exists. Due to the mura 33, the picture quality is degraded.

Also, as shown in FIG. 3B, when the external electrode 15 is exposed out of the side support 17, an operator may be injured by high voltage when assembling the backlight assembly.

SUMMARY OF THE INVENTION

Accordingly, the present invention is directed to a backlight assembly and an LCD having same that substantially obviates one or more problems due to limitations and disadvantages of the related art.

An advantage of the present invention is to provide a backlight assembly capable of decreasing the driving voltage of the EFFLs and securing stability in a high voltage.

Additional features and advantages of the invention will be set forth in the description which follows, and in part will be apparent from the description, or may be learned by practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described, there is provided a backlight assembly comprising: an external electrode fluorescent lamp (EEFL) including an external electrode through which a driving voltage is applied, and a lamp for emitting light; a side support for supporting the EEFL; and a protective cap disposed above a portion of the external electrode, the portion of the external electrode being exposed out of the side support.

In another aspect of the present invention, there is provided an LCD comprising: a backlight assembly, wherein the backlight assembly includes: an external electrode fluorescent lamp (EEFL) having an external electrode through which a driving voltage is applied, and a lamp for emitting light; a side support for supporting the EEFL; and a protective cap disposed above a portion of the external electrode, the portion of the external electrode being exposed out of the side support; and a liquid crystal panel disposed above the backlight assembly.

In another aspect of the present invention, there is provided a method of manufacturing a liquid crystal display device, comprising: forming a backlight assembly including: an external electrode fluorescent lamp (EEFL) having an external electrode through which a driving voltage is applied, and a lamp for emitting light; a side support for supporting the EEFL; and a protective cap disposed above a portion of the external electrode, the portion of the external electrode being exposed out of the side support; and forming a liquid crystal panel disposed above the backlight assembly.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE INVENTION

Reference will now be made in detail to embodiments of the present invention, examples of which are illustrated in the accompanying drawings. Wherever possible, the same reference numbers will be used throughout the drawings to refer to the same or like parts.

Figure 1:
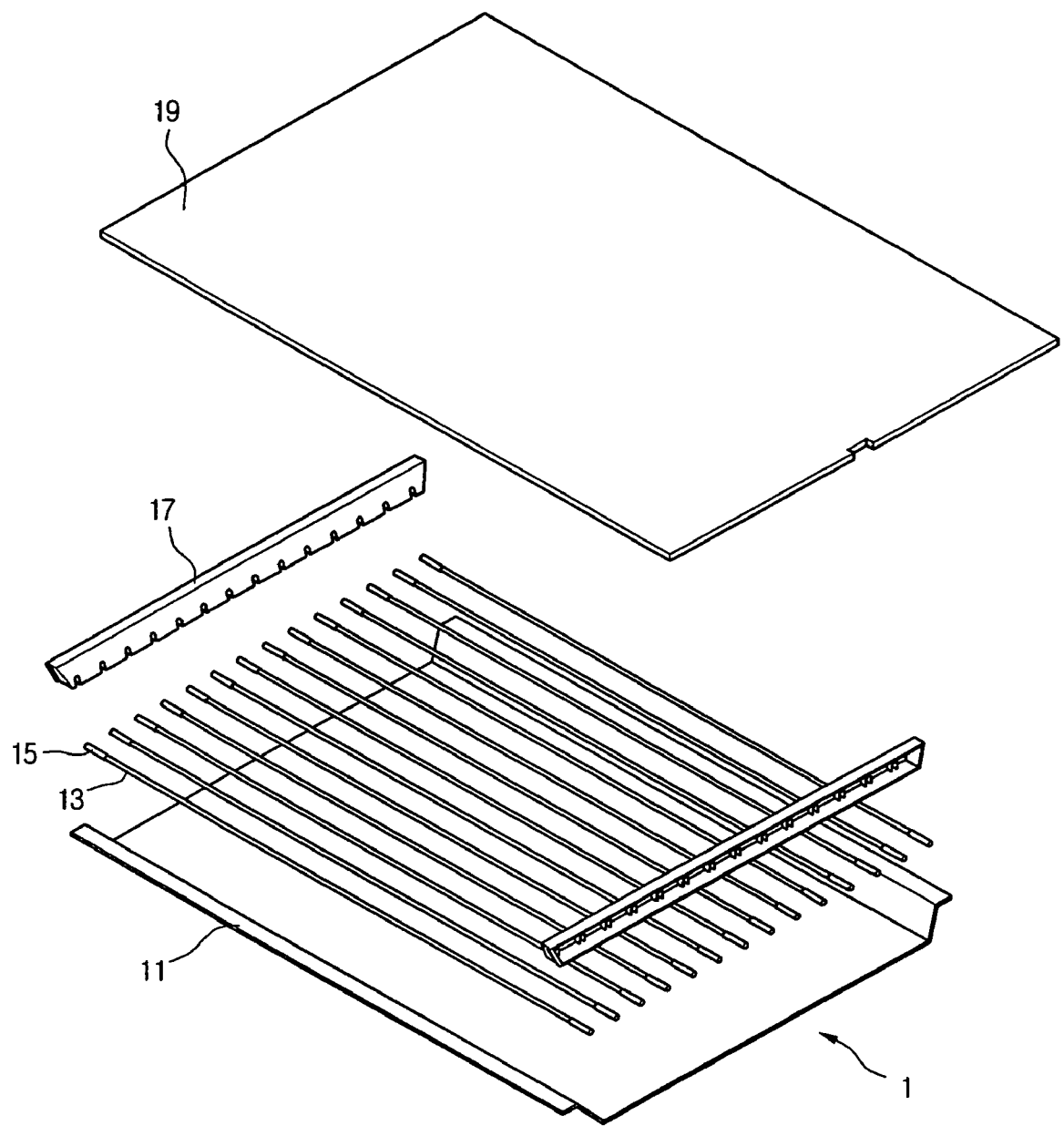
FIG. 1 is an exploded perspective view of a direct type backlight assembly according to the related art.
Figure 2:
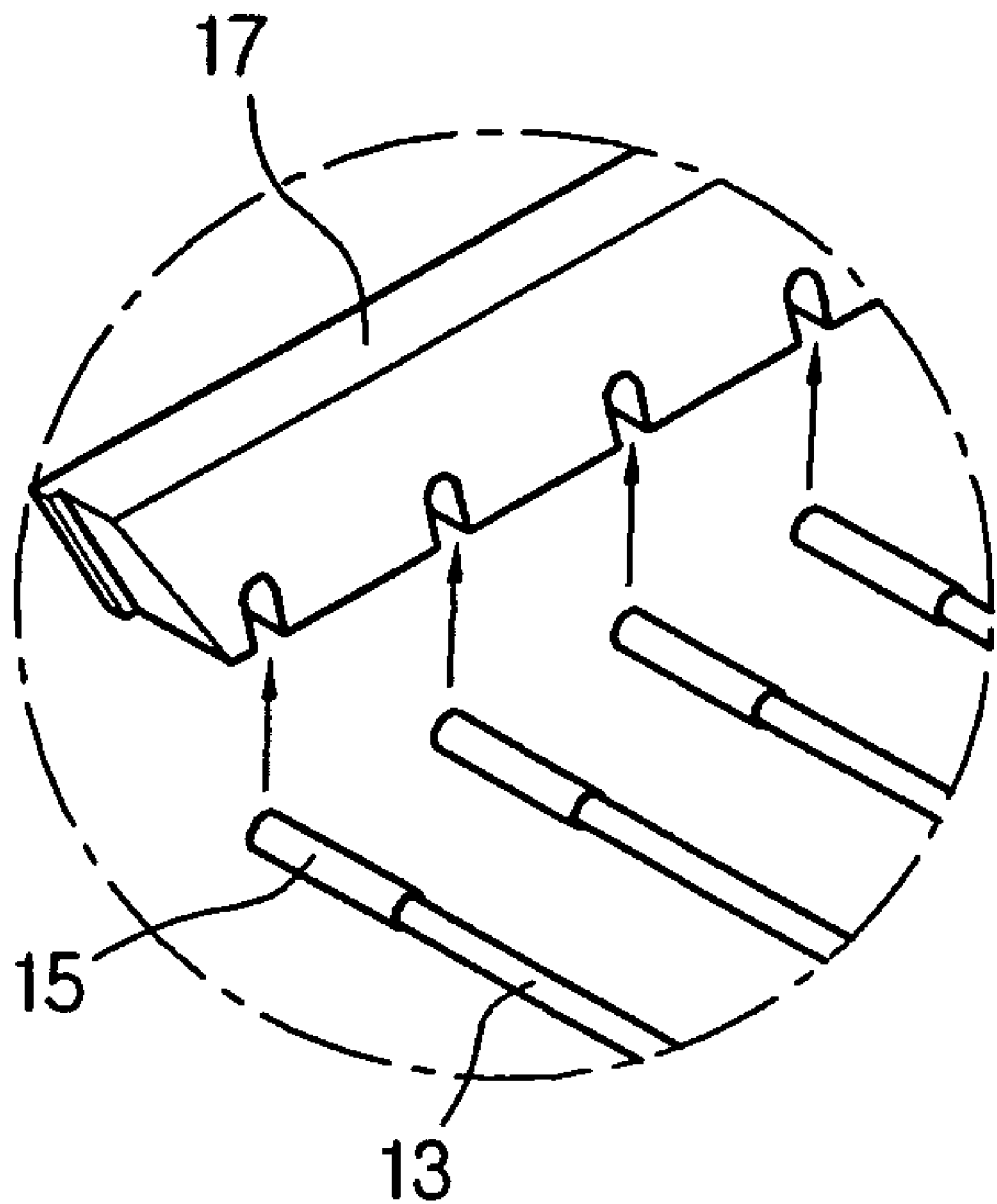
FIG. 2 is an enlarged perspective view illustrating a connection between an EEFL and a side support in the backlight assembly of FIG. 1.
Figure 3A:
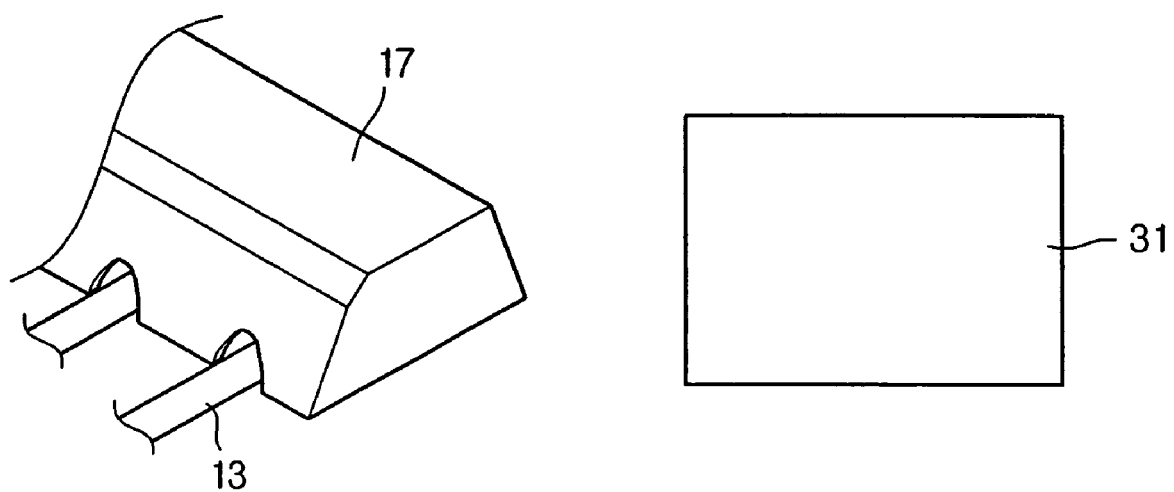
FIGS. 3A and 3B are views illustrating a change in picture quality of an LCD depending on lengths of an external electrode formed in an EEFL.
Figure 3B:
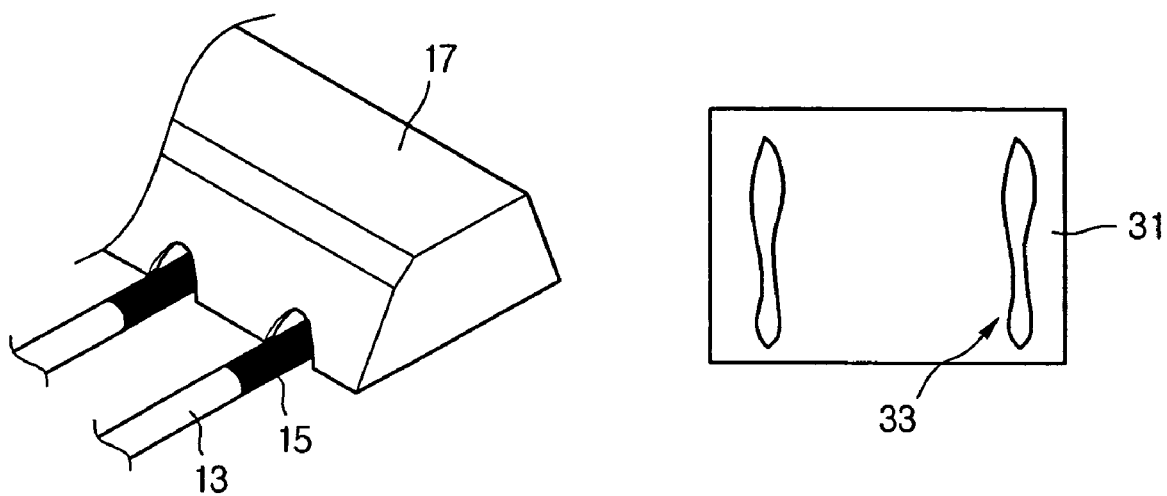
Figure 4:
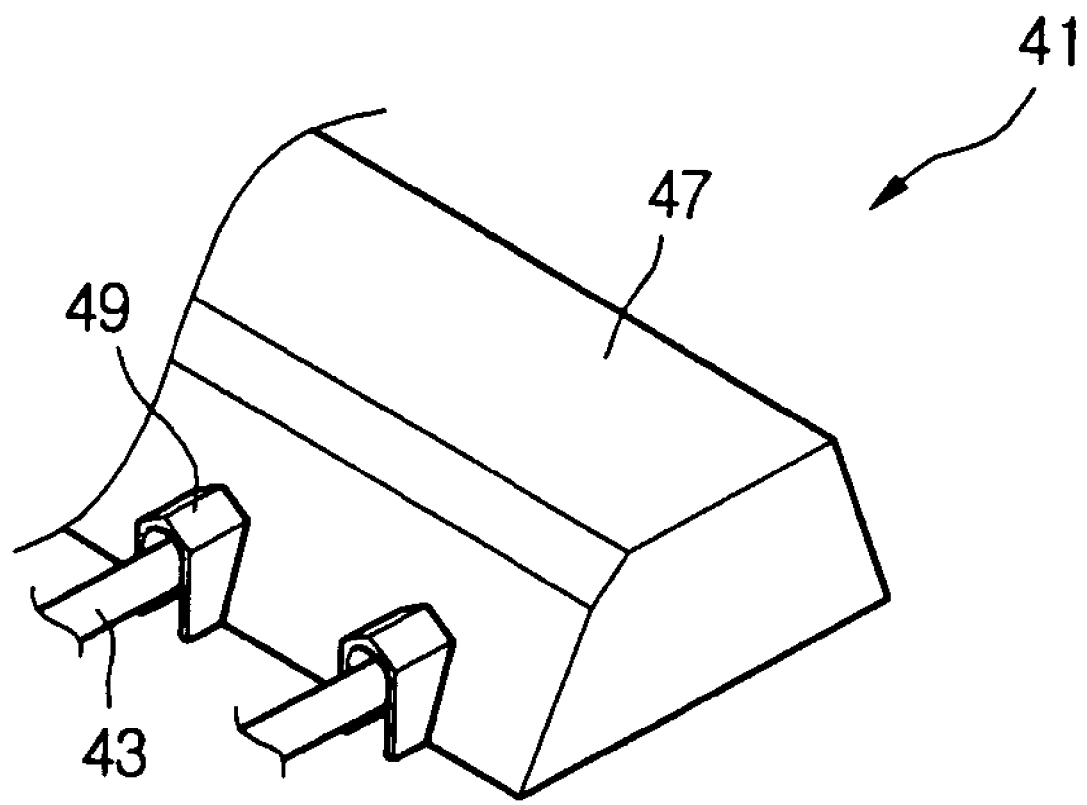
FIG. 4 is an exploded perspective view of a direct type backlight assembly according to an embodiment of the present invention.

In order to solve these problems, the present invention provides a backlight assembly having a structure illustrated in FIG. 4. FIG. 4 is a perspective view of a direct type backlight assembly according to an embodiment of the present invention.

Referring to FIG. 4, the backlight assembly 41 includes a plurality of lamps 43 having external electrodes formed on each end (not shown), side supports 47 for supporting the plurality of lamps 43, and protective caps 49 disposed above the exposed external electrodes. Although not shown, the external electrode for applying a driving voltage to the EEFLs 43 are partially exposed out of the side support 47 (toward an inner space of the backlight assembly).

Figure 5:
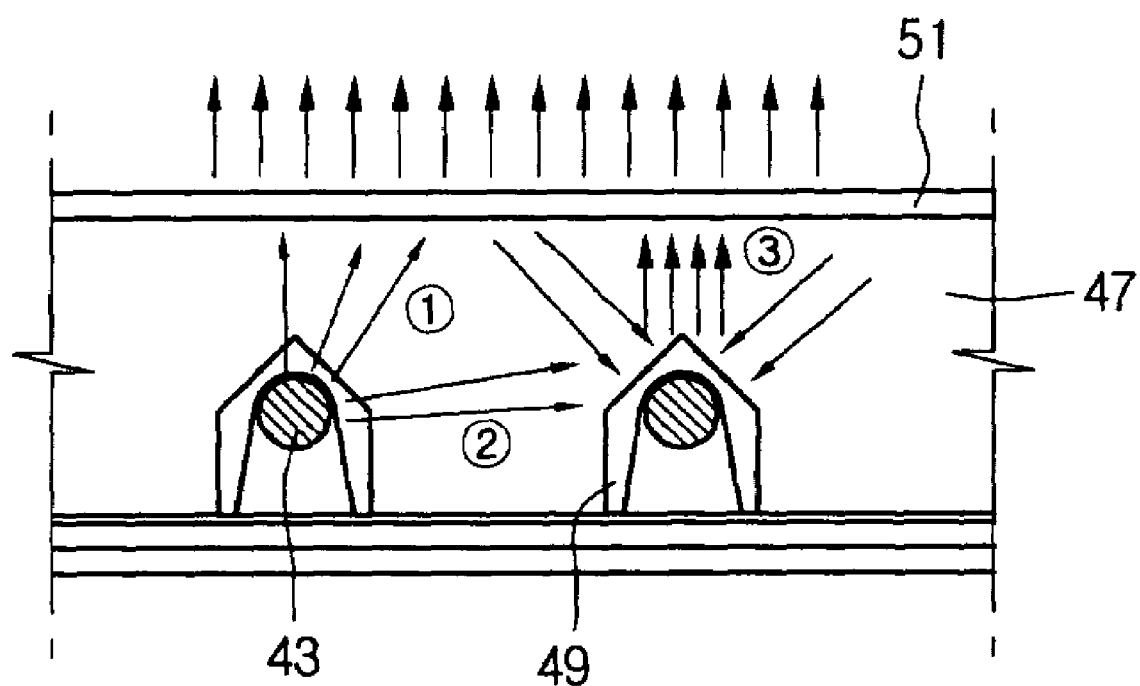
FIG. 5 is a sectional view of the direct type backlight assembly according to an embodiment of the present invention.

The protective caps 49 are formed in a mountain shape as illustrated in the section view of FIG. 5. The protective caps prevent the external electrodes from being exposed. In addition, by forming the protective caps 49 in the mountain shape, the occurrence of a mura caused by darkness in a non-emission region of the external electrode because the shape of the protective caps reflect incident light toward the diffusion plate 51. Although the mountain shape is shown in FIGS. 4 and 5, any shape which results in light incident on the cap being reflected toward the diffusion plate may be employed.

FIG. 5 illustrates is a sectional view of a direct type backlight assembly according to an embodiment of the present invention. As illustrated in FIG. 5, light emitted from the lamps 43 which is incident on the protective caps 49 is reflected towards the diffusion plate 51. More particularly, light emitted from the lamp 43 may be reflected from the diffusion plate 51 towards a surface of the mountain-shaped protective cap 49 (refer to ray 1 in FIG. 5), or light emitted from the lamps 43 may be directly incident onto the mountain-shaped protective caps 49 at a predetermined angle (refer to ray 2 of FIG. 5). In either case, the light incident on the protective cap is reflected is reflected in a forward direction towards the diffusion plate 51 (refer to ray 3 of FIG. 5), thereby preventing the occurrence of a mura that is caused by darkness of the external electrode.

Accordingly, the LCD having the backlight assembly of the present invention can display images with improved picture quality on the liquid crystal panel disposed above the backlight assembly by preventing the occurrence of the mura. Further, since the external electrode for the EEFL can be made long, the driving voltage can be lowered and the high-brightness light source can be provided.

As described above, the backlight assembly according to the present invention can lower the driving voltage of the EEFL, prevent the picture quality of the LCD from being degraded due to the exposed external electrode, and secure the stability for the high voltage.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A backlight assembly comprising:
   an external electrode fluorescent lamp (EEFL) including an external electrode having a first portion and a second portion through which a driving voltage is applied, and a lamp for emitting light;
   a side support for supporting the EEFL, the side support covering the first portion of the external electrode; and
   a reflective protective cap disposed above the second portion of the external electrode to cover the second portion of the external electrode, the second portion of the external electrode being exposed out of the side support,
   wherein the reflective protective cap has a first reflective surface and a second reflective surface at an inclination extending from a vertex of the reflective protective cap such that the incident light emitted from a lamp of another external electrode fluorescent lamp adjacent to the external electrode fluorescent lamp is reflected by the first and second reflective surfaces, wherein the reflective protective cap is not electrically connected to the external electrode fluorescent lamp.

2. The backlight assembly according to claim 1, wherein the protective cap is formed in a mountain shape.

3. The backlight assembly according to claim 1, further comprising a diffusion plate disposed above the EEFL.

4. The backlight assembly according to claim 3, wherein the protective cap is shaped such that light reflected downward from the diffusion plate and incident to the protective cap is reflected upward toward the diffusion plate.

5. The backlight assembly according to claim 1, wherein the protective cap is shaped such that light incident onto the protective cap is reflected towards a display panel.

6. An LCD comprising:
a backlight assembly, wherein the backlight assembly includes:
an external electrode fluorescent lamp (EEFL) including an external electrode having a first portion and a second portion through which a driving voltage is applied, and a lamp for emitting light;
a side support for supporting the EEFL, the side support covering the first portion of the external electrode; and
a reflective protective cap disposed above the second portion of the external electrode to cover the second portion of the external electrode, the second portion of the external electrode being exposed out of the side support; and
a liquid crystal panel disposed above the backlight assembly,
wherein the reflective protective cap has a first reflective surface and a second reflective surface at an inclination extending from a vertex of the reflective protective cap such that the incident light emitted from a lamp of another external electrode fluorescent lamp adjacent to the external electrode fluorescent lamp is reflected by the first and second reflective surfaces,
wherein the reflective protective cap is not electrically connected to the external electrode fluorescent lamp.

7. The LCD according to claim 6, wherein the protective cap is formed in a mountain shape.

8. The LCD according to claim 6, further comprising:
a diffusion plate disposed above the EEFL.

9. The LCD according to claim 8, wherein the protective cap is shaped such that light reflected downward from the diffusion plate and incident onto the protective cap is reflected upward towards the diffusion plate.

10. The LCD according to claim 6, wherein the protective cap is shaped such that light incident onto the protective cap reflected towards the liquid crystal panel.

11. A method of manufacturing a liquid crystal display device, comprising:
forming a backlight assembly including:
an external electrode fluorescent lamp (EEFL) including an external electrode having a first portion and a second portion through which a driving voltage is applied, and a lamp for emitting light;
a side support for supporting the EEFL, the side support covering the first portion of the external electrode; and
a reflective protective cap disposed above the second portion of the external electrode to cover the second portion of the external electrode, the second portion of the external electrode being exposed out of the side support; and
forming a liquid crystal panel disposed above the backlight assembly,
wherein the reflective protective cap has a first reflective surface and a second reflective surface at an inclination extending from a vertex of the reflective protective cap such that the incident light emitted from a lamp of another external electrode fluorescent lamp adjacent to the external electrode fluorescent lamp is reflected by the first and second reflective surfaces,
wherein the reflective protective cap is not electrically connected to the external electrode fluorescent lamp.

* * * * *